United States Patent [19]

Hardwick et al.

[11] Patent Number: 5,320,817
[45] Date of Patent: Jun. 14, 1994

[54] PROCESS FOR SORPTION OF HAZARDOUS WASTE PRODUCTS FROM EXHAUST GAS STREAMS

[75] Inventors: Steven Hardwick, New Milford; James V. McManus, Danbury, both of Conn.

[73] Assignee: Novapure Corporation, Danbury, Conn.

[21] Appl. No.: 937,243

[22] Filed: Aug. 28, 1992

[51] Int. Cl.$^5$ .................. C01C 3/00; B01D 47/00; C01B 7/00; B01J 8/00
[52] U.S. Cl. ................... 423/237; 423/210; 423/240 R; 423/245.1
[58] Field of Search .......... 423/237, 238, 245.3, 423/210, 245.1, 240 R

[56] References Cited

U.S. PATENT DOCUMENTS

| 4,535,072 | 8/1985 | Kitayama | 502/411 |
| 4,605,812 | 8/1986 | Nowack et al. | 585/845 |
| 4,761,395 | 8/1988 | Tom | 502/401 |
| 4,906,447 | 3/1990 | Schwarzenhok | 423/238 |
| 5,019,667 | 5/1991 | Chao | 585/820 |
| 5,024,823 | 6/1991 | Gökcek | 423/210 |
| 5,037,624 | 8/1991 | McManus | 423/210 |
| 5,057,242 | 10/1991 | Tom | 252/194 |
| 5,151,395 | 9/1992 | Tom | 502/67 |

FOREIGN PATENT DOCUMENTS

791437 3/1958 United Kingdom ............... 423/238

OTHER PUBLICATIONS

"TLV's–Threshold Limit Values and Biological Exposure Indices for 1987–88," ACGIH, 1987, Air Contaminants–Permissible Exposure Limits.
"CVD Exhaust–Safety and Environmental Sanity," M. L. Hammond, Euro CVD8, J. Phys. Colloq. C2, Sep. 1991, pp. C2-449-57.
"Vent Sorb" Calgon Corp., 1986.
"VLSI Fabrication Principles: Silicon and Gallium Arsenide," S. K. Gandhi, John Wiley & Sons, New York, 1983, pp. 427-429.

Primary Examiner—Gregory A. Heller
Attorney, Agent, or Firm—Steven J. Hultquist

[57] ABSTRACT

A method for cleaning an exhaust gas containing ammonia and at least one silicon-containing compound selected from the group consisting of silane and chlorosilanes, which comprises contacting the exhaust gas with a scavenger comprising a metal salt which forms tight complexes with ammonia. This ammine-forming metal salt may be immobilized on a porous solid support. Suitable ammine-forming metal salts include the sulfates, nitrates, chlorides, bromides, iodides, and hydroxides of copper, cobalt, iron, and nickel. Suitable supports include materials which are compatible with the gas mixtures being cleaned and the reaction products of the sorption process and which are stable under the conditions of use. Useful support materials include zeolites, aluminosilicates, alumina, silica, silica gel, kieselguhr, and activated carbon.

10 Claims, 2 Drawing Sheets

PROCESS FOR SORPTION OF HAZARDOUS WASTE PRODUCTS FROM EXHAUST GAS STREAMS

BACKGROUND OF THE INVENTION

1. Field of the Invention

This invention relates to gas sorption compositions, apparatus, and associated processes, for effecting the sorptive removal of hazardous gases such as are widely encountered in the manufacture of semiconductor devices, such as silane, dichlorosilane, trichlorosilane, silicon tetrachloride in conjunction with sorptive removal of ammonia. The present invention further relates to a process of removing such compounds from gas streams with a single adsorbent.

2. Description of the Related Art

Silicon nitride films are extensively used in both silicon and gallium arsenide device technology. Silicon nitride is a dense insulator with a dielectric constant of 5.8–6.1, a refractive index of 1.98–2.05, and a density between 2.3 and 2.8 g/cm$^3$. Unlike silica or phosphosilicate glass, it is an excellent barrier to alkali ion migration and is virtually impermeable to water, so it is used extensively as a cover layer in MOS technology. Its use has allowed unencapsulated circuits to be practical in many consumer applications. Because it restricts the diffusion of gallium, it is used as a "capping" material for gallium arsenide during the high temperature anneals that must be carried out after ion implantation steps. It is about 100 times more resistant to thermal oxidation than silicon, so that it can be used as a mask in a number of silicon-based VLSI processes which require selective oxidation of the semiconductor. It is used in radiation-hardened devices because of its superior radiation resistance over silicon dioxide.

A layer of silicon nitride may be grown on silicon by direct nitridation, but this process must be carried out at high temperatures (1000°–1300° C.) and is extremely sensitive to even trace amounts of water or oxygen. Furthermore, film thickness is greatly restricted by the low diffusivity of nitrogen through silicon nitride. Therefore, all silicon nitride films used in silicon and gallium arsenide technology are deposited, most commonly by chemical vapor deposition (CVD).

Silicon nitride films may be formed by chemical vapor deposition using silane and ammonia, hence:

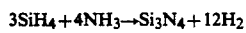

Deposition can be accomplished at atmospheric as well as at reduced pressures. Typically large excesses of the nitrogen source ammonia are used in order to obtain optimal silicon nitride stoichiometry.

Silane is extremely flammable, reacting with air explosively in even low dilutions. Thus, some nitride systems use chlorosilanes which are safer to handle, as for example:

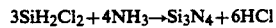

An excess of ammonia is again generally used, but the ratio of NH$_3$ to chlorosilane does not need to be as high as when silane is used as the silicon-containing gas component.

The effluent gas stream from silicon nitride CVD reactors typically contains large amounts of unreacted silane or chlorosilane and ammonia, as well as reaction by-products such as hydrogen chloride and ammonium chloride in the chlorosilane process. These components must be scrubbed from the effluent gas stream, to very low levels, so that they are not released to the environment or to downstream equipment such as vacuum pumps.

The "Threshold Limit Value" or TLV (American Conference of Governmental Industrial Hygienists: "Threshold Limit Values and Biological Exposure Indices," 1987, Cincinnati, Ohio) and analogous "Permissible Exposure Limit" or PEL (U.S. Department of Labor, Occupational Safety and Health Administration: 29 CFR 1910.1000) are concentrations of gases in workplace air, below which it is believed that routine exposure poses no risk of harm to personnel. These concentrations are thus benchmarks for effluent gas scrubbing. An adequate scrubber must remove hazardous gas components from the effluent gas stream to concentrations below the TLV or PEL.

Silane is considered toxic; its TLV and PEL are set at 5 parts per million (ppm). The consequences of release of silane into the workplace can be dire, for, in addition, it is extremely flammable, reacting with oxygen explosively even in very dilute form. The lower flammable limit for silane in air is 1.5%. For safety considerations, chlorosilanes are often used as alternative silicon sources. These materials are toxic and corrosive. They decompose readily in moist air or on mucous membranes to form oxidized silicon species and hydrogen chloride. Because of their ready hydrolysis to form HCl, TLVs and PELs have not been formulated for all chlorosilane compounds, but the TLV of HCl is used (5 ppm).

Ammonia is toxic and corrosive, as is hydrogen chloride. TLV and PEL for ammonia are 25 ppm and 50 ppm respectively, and for hydrogen chloride both TLV and PEL are set at 5 ppm.

When the silicon nitride is formed by the chlorosilane plus ammonia CVD process, large amounts of by-product ammonium chloride may be formed. This ammonium chloride is abrasive, and if it is not scrubbed from the effluent stream or prevented from forming, it is very destructive to vacuum pumps and any other downstream equipment. By-product ammonium chloride can also clog downstream ducts resulting in onerous maintenance and down-time for the facility.

A good effluent gas scrubber must not only remove hazardous gas components to below TLV/PEL, but must also possess several other attributes. It must operate safely, with no risk of explosion or spillage. It should have high capacity for the hazardous components, so that it need not require an extremely large volume for scrubbing or frequent change-outs. It must have high kinetic efficiency for scrubbing, so that high flow rate effluent gas streams may be scrubbed. Scrubbers of a simple, passive design are preferred, since they are likely to be more economical. Finally, the scrubber should convert the hazardous components of the effluent gas stream to stable, environmentally acceptable species that may be disposed of safely and economically.

The capacity of the scrubber is considered to be that amount of the hazardous gas component that can be sorbed per unit of scavenger, before breakthrough occurs. Breakthrough occurs when the hazardous component passes through the scrubber in concentrations higher than its TLV or PEL. Breakthrough may be monitored by a variety of commercially available hazardous gas monitors such as the MDA Toxic Gas Detector or the Gas Tech Detector Tubes, or colorimetrically.

In general, the known methods of scrubbing the effluent gas streams from CVD reactors include wet scrubbing, combustion (so-called "burn boxes"), plasma scrubbing, and dry scrubbing methods such as activated carbon.

Using wet scrubbing, the exhaust gas stream may be processed using aqueous solutions of relatively cheap reagents such as sodium hydroxide or potassium permanganate. However, wet scrubbing requires a large gas treating unit and the resulting large volumes of aqueous waste solutions may present problems as to environmentally acceptable disposal. In addition, the aqueous solutions used are very corrosive, and they thus can corrode fittings and connections and present risks to personnel and equipment in the event of an equipment failure. Commercially available aqueous ammonia scrubbers can scrub silane or chlorosilanes, but in the process they generate hydrous silica which clogs filters. In addition, the efficiency of aqueous scrubbers for silane is usually very low.

In combustion processes, the waste gases are brought into contact with air in a combustion chamber and are burned. When silane is used, such processes may present an unacceptable explosion hazard. In addition, combustion is not applicable to highly corrosive effluent gas streams such as are encountered from silicon nitride CVD processes.

The exhaust gas from the CVD reactor may be scrubbed by passing it through a plasma chamber (see Hammond, M. L., "CVD Exhaust-Safety and Environmental Sanity," Proc. Eur. Conf. Chem. Vap. Deposition, 8th, C2/449-C2/457, 1991). However, such a method requires fairly complicated, expensive equipment and is limited in application to low pressure processes.

The use of activated carbon beds to physically adsorb hazardous constitituents from semiconductor manufacturing gas streams is well established (see Calgon Carbon Corporation, "Ventsorb ® for Industrial Air Purification," Bulletin 23-56b, 1986). Activated carbon, while highly efficient, scavenges hazardous gas constituents by both physical and chemical adsorption. Physically adsorbed constituents can later desorb unless the carbon is periodically treated by carefully controlled oxidation. The use of activated carbon to treat silane is especially undesirable because of the extreme flammability of silane and the combustible nature of carbon.

Dry scrubbing methods for silane have been described, wherein the silane reacts with a scavenger such as a metal hydroxide or metal salt immobilized on a solid support material (Kitayama, M., et al., U.S. Pat. No. 4,535,072; Gokcek, C., U.S. Pat. No. 5,024,823). In addition, similar dry scrubbing methods for removing ammonia from air or gas streams comprising hydrocarbons have been described (Chao, C., and Rastelli, H., U.S. Pat. No. 5,019,667). Such dry scrubbing methods have the advantage of being passive, simple systems. However, the simultaneous scrubbing of highly basic ammonia and the hydride gas silane with a single variety of scrubber or scavenger material has not been addressed.

Therefore, it would be a substantial advance in the art to provide gas sorption compositions which may be usefully employed to scrub the effluent gas stream from silicon nitride CVD processes and to remove all of the hazardous gas components, both from atmospheric pressure processes as well as in low pressure processes.

Accordingly, it is an object of the present invention to provide a method for cleaning an exhaust gas containing ammonia and a silicon-containing gas component such as silane and/or a chlorosilane compound.

Another object of this invention is to provide a dry scrubbing method for removing ammonia and a silicon-containing gas component(s) from an exhaust gas, providing a waste material that is very compact and which is improved in safety and environmental acceptability.

A still further object of this invention is to provide a method for cleaning an exhaust gas using a scavenger that has a high kinetic efficiency and a high capacity for ammonia and a silicon-containing gas component such as silane and/or a chlorosilane compound.

SUMMARY OF THE INVENTION

In order to overcome the drawbacks of the prior art, the inventors studied processes for efficiently removing both ammonia and the silicon-containing gas component from silicon nitride CVD effluent gas streams. They unexpectedly found that if certain metal salts were used as the scavenger for sorption of these hazardous gas components from mixed effluent gas streams containing both ammonia and a silicon gas, surprising advantages resulted. The metal salts that provide these advantages are those that form an ammine complex upon reaction with ammonia. The kinetic efficiency of these metal salts to scrub silane increased markedly in the presence of ammonia. In the presence of ammonia, scrubbing of chlorosilane compounds became much more efficient, i.e., the metal salt scavenger had a much higher capacity for sorbing chlorosilane compounds in the presence of ammonia than in its absence. Simultaneous scrubbing of chlorosilanes and ammonia provided an unexpected advantage in that the by-products of chlorosilane scrubbing reacted with the ammonia to form involatile species which could no longer be thermally desorbed from the scrubber.

The invention is in its essence a method for cleaning an exhaust gas containing ammonia and at least one silicon-containing compound selected from the group consisting of silane and chlorosilanes, which comprises contacting the exhaust gas with a scavenger comprising an ammine-forming metal salt. As used herein, the term "ammine-forming metal salt" means a metal salt reactive with ammonia to form an aminated metal salt complex which is stable at STP (25° C., 1 atmosphere) conditions, comprising the metal salt in a complex with a nitrogen-containing moiety deriving from the ammonia, e.g., quaternary ammonium, amino, amido, imino, etc. Further, the ammine-forming metal salt may be immobilized on a porous solid support. Especially suitable ammine-forming metal salts include the sulfates, nitrates, chlorides, bromides, and iodides of copper, cobalt, iron, and nickel. Suitable supports include materials which are compatible with the gas mixtures being cleaned and the reaction products of the sorption process and which are stable under the conditions of use. Useful support materials include zeolites, aluminosilicates, alumina, silica, silica gel, kieselguhr, and activated carbon.

The flow characteristics and therefore the contact time of the gas with the scavenger may be adjusted by selection of appropriate support material. In applications involving high flow rates, the scavenger may thereby be tailored for high kinetic efficiency; conversely under conditions of low flow, a highly loaded, high capacity support may be selected. To gain the advantages of both high efficiency and high capacity, scavenger beds may comprise more than one type of support/metal salt combination, in layered or mixed form.

The exhaust gas is contacted with the ammine-forming metal salt while passing through a column or vessel filled with the scavenger. The ammonia and the silane or chlorosilane compounds are removed from the exhaust gas by sorption to obtain a cleansed gas. The term "sorption" as used herein means that the hazardous gases are removed from the exhaust gas and fixed by the scavenger by chemical reaction between the hazardous gases and the scavenger, and, therefore, the sorption is distinguished from mere physical adsorption or absorption. That the scrubbing mechanism is sorption is an advantage of the present invention.

The process of treating nitride effluent using the present invention can conveniently be carried out at temperatures from ambient to 100° C. Ambient temperature is preferred for customer convenience and economic reasons. The present invention is preferably practiced at ambient pressure, although there is no fundamental reason either reduced or elevated pressures would not be effective. At low pressure, the contact time in the bed increases, requiring larger beds to maintain kinetic efficiency. At elevated pressures contact time increases, decreasing the necessary bed size. In a common application of this invention, the scrubber may be placed downstream of the process vacuum pump and used at ambient pressure or just slightly below.

DETAILED DESCRIPTION OF THE INVENTION, AND PREFERRED EMBODIMENTS THEREOF

Figure 1:
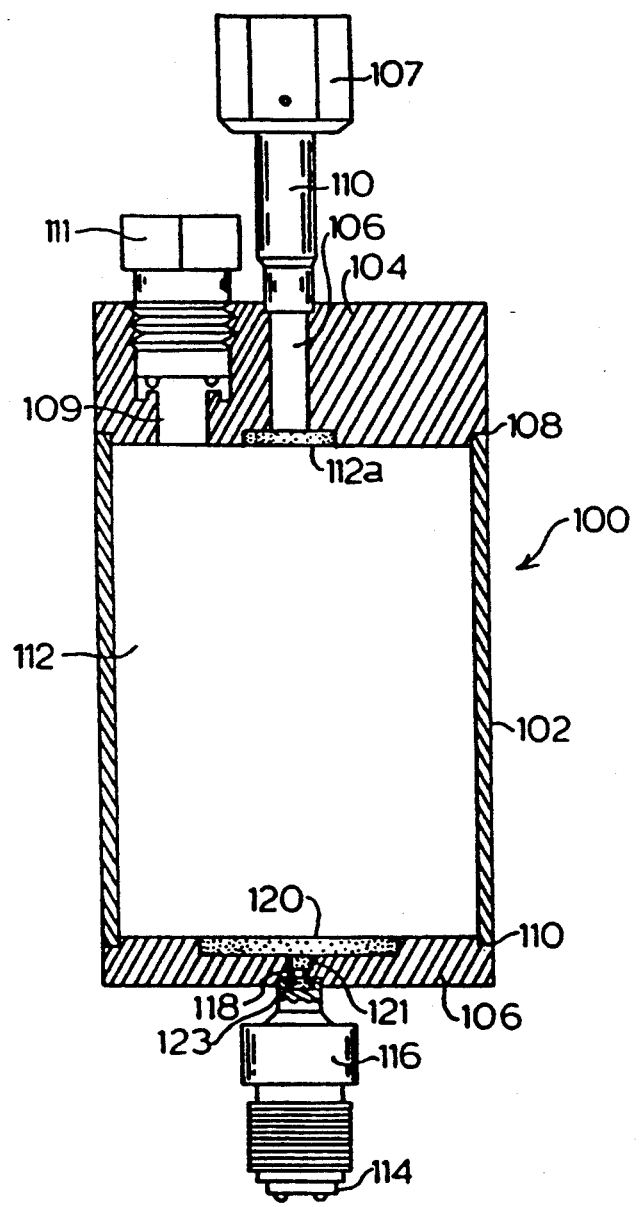
FIG. 1 is a schematic diagram of a gas scrubbing apparatus useful in the practice of the present invention.

The present invention is based on the discovery that ammine-forming metal salts are especially effective for scrubbing mixed effluent gas streams, to remove both ammonia and silane or chlorosilane compounds. An unexpected synergistic enhancement of the scrubbing process was found to occur when such salts were used as the active scavenging medium for gas streams containing both types of hazardous gas components. When silane or chlorosilane-type compounds are scrubbed, ammonia scrubbing becomes irreversible. When ammonia is being scrubbed, the efficiency and capacity for chlorosilane scrubbing are significantly enhanced. The kinetic efficiency of silane scrubbing increases markedly in the presence of ammonia.

The scavengers of the present invention comprise metal salts that react with ammonia to form ammine complexes. An example of such salts is copper sulfate, either hydrated or anhydrous:

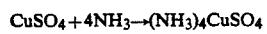

If the copper sulfate pentahydrate is used, ammonia readily displaces the waters of hydration. Other representative examples of useful metals salts include (but are not limited to) chromium (III) chloride, iron (II) chloride, nickel (II) nitrate, nickel (II) bromide, nickel (II) chlorate, nickel (II) iodide, cobalt (II) bromide, cobalt (II) chloride, cobalt (III) chloride, cobalt (II) iodide, cobalt (III) nitrate, cobalt (II) sulfate, cobalt (III) sulfate, copper (II) chloride, copper (II) dithionate, copper (II) nitrate, copper (II) sulfate, copper (II) acetate, rhodium (III) chloride, iridium (III) chloride, iridium (III) nitrate, palladium (II) chloride, platinum (II) chloride and platinum (IV) chloride. Preferred metals are Cr(III), Fe(II), Ni(II), Co(II), Co(III), Cu(II), Rh(III), Pd(II), Pt(II), and Pt(IV).

A measure of the ability of various metal ions to bind ammonia is equilibrium constant, defined below:

Larger values of K are indicative of a higher driving force to the right for any given value of x. Equilibrium constants for some representative metal ions in complexation with ammonia are given below:

| LOG K VS METAL ION AND LIGAND STOICHIOMETRY | | | | | | |
|---|---|---|---|---|---|---|
| | x = 1 | x = 2 | x = 3 | x = 4 | x = 5 | x = 6 |
| $Mn^{+2}$ | 1.0 | 1.54 | 1.70 | 1.3 | — | — |
| $Fe^{+2}$ | — | — | — | — | — | — |
| $Co^{+2}$ | 2.10 | 3.67 | 4.78 | 5.53 | 5.75 | 5.12 |
| $Ni^{+2}$ | 2.81 | 5.08 | 6.85 | 8.12 | 8.93 | 9.08 |
| $Cu^{+2}$ | 4.24 | 7.83 | 10.80 | 13.00 | 12.43 | — |
| $Co^{+3}$ | — | — | — | — | — | 35.21 |

(Source: Critical Stability Constants, Vol. 4: Inorganic Complexes, Smith and Martell, 1916)

It can clearly be seen from the table that the equilibrium constant for binding ammonia increases as one moves across the periodic table from $Mn^{+2}$ to $Cu^{+2}$. As a result, one would expect copper to remove ammonia to the lowest levels in silane/ammonia applications where no by-product HCl is present to produce ammonium chloride. $Co^{+3}$ complexes are also expected to be very good at removing ammonia to very low levels. Note that while no data is available for ammonia, the equilibrium constant is predicted to fall between manganese and nickel.

Several considerations are important in the selection of the preferred metal salt. The salt should be soluble in water or alcohol, so it can be readily dispersed on a support. Consequently, chloride, iodide, nitrate, bromide, chlorate and acetate salts are preferred. The metal should also be inexpensive, favoring the first row transition metals, chromium, iron, nickel, cobalt and copper. It is further desirable that the metal salt not be highly toxic or hazardous for disposal. Chromium is a federally regulated toxic waste, and thus its use is less preferred. Most preferred salts will be those of iron, nickel, cobalt and copper. In the present invention copper is especially preferred because of its excellent ability to scavenge hydrides such as silane.

Hydride reduction of metal salts often proceeds with anion reduction, generating undesirable by-products such as HCl (chlorides), HBr (bromides), HI (iodides), and oxides of nitrogen (nitrates). The use of metal sulfates is most preferred since sulfate reduction generates involatile metal sulfites.

Metal salts may be used in hydrated or anhydrous form. Where residual moisture is desirable, as in applications where the hydrate can assist in hydrolyzing chlorosilanes, the hydrates are preferred.

To improve the efficiency of scrubbing, the metal salt may be provided on a porous carrier or support. Suitable supports include materials which are compatible with the gas mixtures being cleaned and the reaction products of the sorption process and which are stable under the conditions of use. Useful support materials include zeolites, aluminosilicates, alumina, silica, silica gel, kieselguhr, and activated carbon. The support should have a high surface area, preferably greater than 100 square meters per gram, and most preferably greater than 200 square meters per gram.

Polymeric supports such as macroreticulate polystyrene-divinylbenzene copolymer or polystyrene-polyvinylpyridine may also be used, but they are less preferred because they are combustible.

The choice of support can have a significant impact on the attainable scrubbing performance. Silica gel has a high surface area and large pore volume, providing the capacity for loading large quantities of metal salt. As a result, silica gel is a preferred support for applications where high capacity is important. Zeolites have a large pore volume, but the pore sizes are very small and are easily plugged. Consequently, there is an upper limit to which the pore volume of the zeolite can be used to generate large capacities. On the other hand, supports such as zeolites and activated carbon, which have exceptional adsorbent capability provide for high kinetic efficiency. Zeolites are especially preferred supports for high efficiency applications because they are not combustible.

The flow characteristics and therefore the contact time of the gas with the scavenger may be adjusted by selection of appropriate support material. In applications involving high flow rates, the scavenger may thereby be tailored for high kinetic efficiency. For example, a scavenger comprising a light loading of metal salt immobilized on a 13X zeolite scrubs ammonia and dichlorosilane with high kinetic efficiency and is useful for high flow rate effluent gas streams. Conversely under conditions of low flow, a highly loaded, high capacity support may be selected. For example, a scavenger comprising a highly loaded metal salt on silica gel provides a high capacity scavenger that is useful in applications where compact scrubber size or increased length of time between changeout is important. To gain the advantages of both high efficiency and high capacity, scavenger beds may comprise more than one type of support/metal salt combination, in layered or mixed form.

The scrubber should have a high capacity, to provide maximal scrubbing without the need for a large vessel or high volume of scavenger. Suitable capacities are 0.5 moles per liter, and preferably greater than 1 mole per liter, and most preferably greater than 2 moles per liter. In typical applications, the capacity should be sufficiently high that the scavenger bed requires change out only 1–4 times per year.

The metal salt may be present on the support at concentrations ranging from 0.25 moles metal per liter of scavenger to 2 moles metal per liter of scavenger. In some cases it is advantageous to utilize high loadings to achieve high capacity. In other applications involving high flow rates, high efficiency is more critical. In these high flow rate applications, the metal salt loading may be reduced.

A mixture of two or more compositions may be advantageously employed to achieve the optimum balance of capacity and high efficiency. For example, a heavily loaded copper sulfate on silica gel may be used for half the scavenger to provide high capacity. The remainder of the scavenger may comprise lightly loaded copper sulfate on zeolite molecular sieves to provide high efficiency for high flow applications. Multiscavenger or composite scavenger beds are herein defined as beds comprising a same or different metal salt supported on two or more different support materials, wherein each support material is present as separate and discrete dupport bodies (e.g. particles) relative to the other support material(s). Such composite scavenger beds may comprise localized bed regions, as for example layers, of the different scavengers, or alternatively, the different scavengers may be interspersed with one another in a "salt and pepper" fashion in the bed. In a preferred embodiment, layered scavenger beds may be used.

Scavengers comprising ammine-forming metal salts immobilized on supports may be prepared by treatment of the support with an aqueous or alcohol solution of the metal salt, followed by a drying step to remove excess moisture. Typically, an aqueous solution of a soluble salt such as copper sulfate or ferrous sulfate is mixed with the solid support material in a stirred apparatus such as a rotary dryer, which may then be heated to remove excess moisture.

The scavengers of the present invention are stable upon storage. Exposure to air or moisture does not compromise the effectiveness of the scrubbing process.

In the effluent gas scrubber, the scavenger may be contained in any container, as would be known to one skilled in the art. Gas stream flow may be either upwards or downward. Downward flow is preferred at high flow rates to prevent fluidization of the scavenger bed, which can diminish scavenging efficiency, result in the attrition of bed solids via erosion of the fluidized solids, and involve carry-out of fines with the effluent gas discharged from the scavenger bed.

The scrubbing process may be carried out with or without a particle filter mounted before the scavenger vessel. The purpose of the particle filter is to trap ammonium chloride dust generated in the CVD reactor.

FIG. 1 is an elevation view, in partial cross section, of a gas scrubber apparatus according to one embodiment of the invention, such as may be usefully employed in the nitride deposition process used in semiconductor manufacturing. The scrubber apparatus 100 illustrated in FIG. 1 comprises cylindrical housing 102, to the upper end of which is leak-tightly joined a first end cap 104. Correspondingly, the lower end of the housing 102 is leak-tightly joined to a second end cap 106. The respective end caps 104 and 106, as well as the cylindrical housing 102, may be formed of any suitable material, such as stainless steel.

At the respective upper and lower joints 108 and 110, the end caps may be joined to the receptacle 102 in any suitable manner providing a leak-tight securement of the repective elements to one another. Although welding is typically employed for such purpose, other joining or bonding methods may be employed, as desired.

The resulting vessel construction thus defines and interior volume 112 in which may be disposed a bed (not shown) of a scavenger. At the lower end of the vessel is provided a closure fitting 114, secured to the male nut 116, which in turn is secured to the end cap 106. An inlet port assemble is thereby formed, associated with the influent gas flow passage 118, by means of which gas containing the undesired hazardous gas constituent may be introduced for contacting with the scavenger.

In order to suitably retain the scavenger bed solids in the scrubber vessel, and accommodate the pressure drop characteristics of the gas scrubber system, the influent passage 118 may have associated therewith porous elements 120, 121, and 123, which are of suitably porous character to allow flow of the impurity-containing gas mixture into the vessel for treatment therein, while at the same time retaining the particulate scavenger in the contacting vessel. The porous elements 120, 121, and 123 may for example comprise wire, mesh, or screen elements of suitable porosity characteristics. Sintered metal frits may advantageously be employed as the porous elements, since such sintered elements can readily be fabricated from a wide variety of materials, including corrosion-resistant materials, with widely varying porosity characteristics.

Correspondingly, the upper end cap 104 comprises an effluent flow passage 106 for egress of impurity-depleted gas mixture from the scavenger vessel. A check valve 110 is joined to the upper end cap 104 as shown, with a female nut 107 being joined in turn to the check valve. The upper end cap 104 also includes a fill port 109 for introducing scavenger material into the vessel, and removing spent scavenger composition therefrom. The fill port 109 is threaded at its upper extremity to accomodate the positioning therein of a closure plug 111 during the normal use of the scavenger vessel.

In order to prevent by-passing or entrainment loss of particulate solids from the scavenger bed in operation of the scavenger apparatus shown in FIG. 1, a solids retention element 112 is disposed at the inlet of the effluent flow passage 106, suitably being accommodated by a counter-bored recess in the end cap interior surface, as shown. The solids retention element 112 may have a structure similar to the aforementioned porous elements 120, 121, and 123, and advantageously may comprise a sintered metal frit. When the scavenger vessel shown in FIG. 1 is not installed for use but filled with scavenger material, it is suitably provided with closure fittings at its respective upper and lower ends to accommodate storage and transport.

Figure 2:
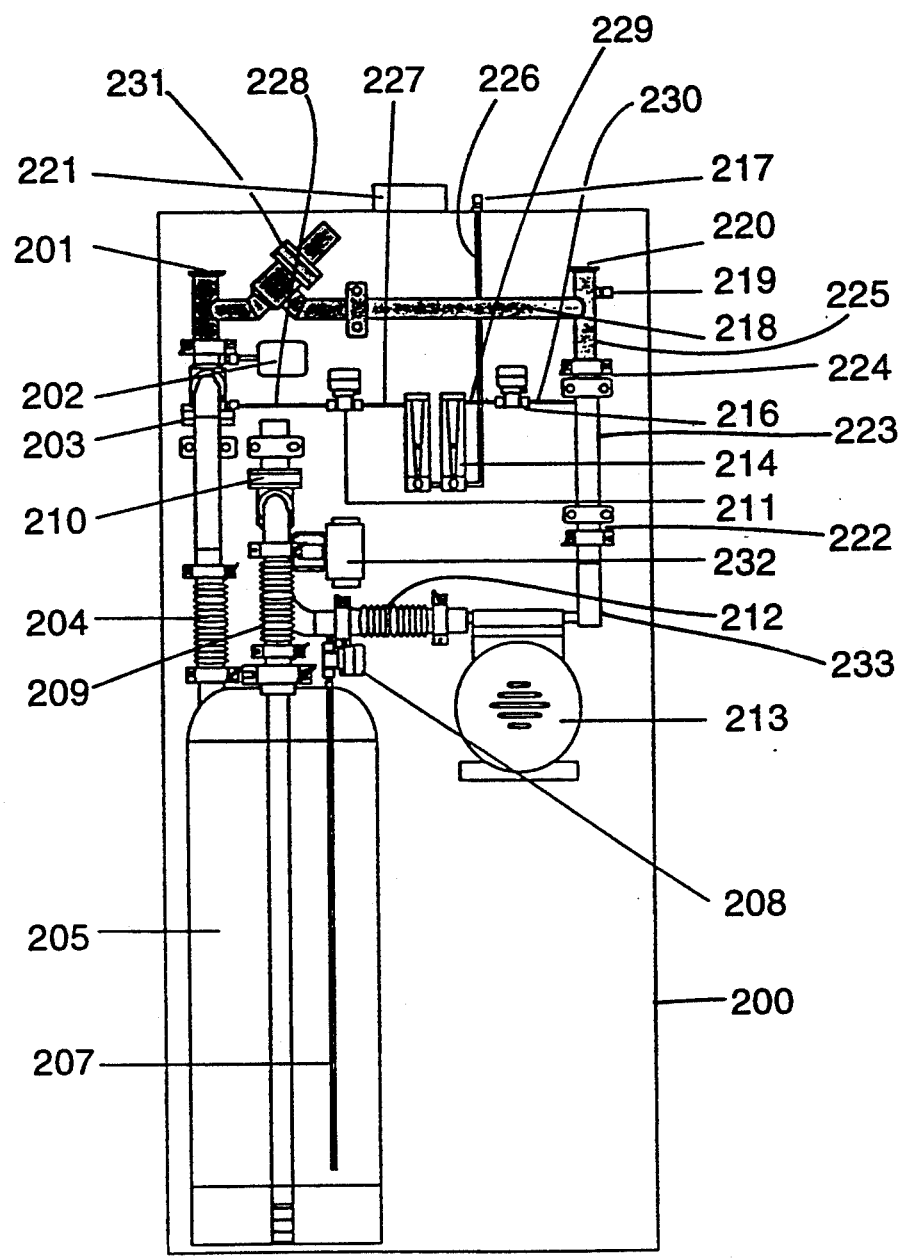
FIG. 2 is a representation of another gas scrubbing apparatus useful in the practice of the present invention, as it is used to clean the effluent gas stream from a chemical vapor deposition process.

FIG. 2 shows a scrubber commercially useful in the practice of the present invention, in use to scrub the effluent from a chemical vapor deposition reactor. A gas cabinet 200, with a vent 221, contains the scrubber canister and all of its associated parts. Exhaust gas flows into the system via the process gas inlet 201, where its flow is monitored by inlet pressure transducer 202. The exhaust gas flows on through inlet valve 203 and inlet flexible connection 204 into the scavenger canister 204. The direction of flow is downward. The is cleaned by the scavenger with the canister (not depicted) and exits through exit gas flow pathway 206 to outlet flexible connections 209 and 212, controlled by outlet valve 210 and vacuum control valve 211. Vacuum pump or eductor 213 maintains the pressure drop across the system.

The now-cleaned exhaust gas flows through outlet gas pathway 212 through 213 and outlet gas pathway 221, connection 222, outlet gas pathway 223, connection 224, and outlet gas pathway 225 to the scrubbed gas outlet 220. As the scrubbed gas passes through outlet gas pathway 225, it may be sampled via hazardous gas detector port 219. Nitrogen inlet 217 can be used to provide a constant inert gas flow via gas flow pathway 226 and purge and dilution flowmeters 215, through the scavenger bed by way of gas flow pathways 227 and 228 controlled by nitrogen purge valve 214, or through the exhaust gas pathways by way of gas flow pathways 229 and 230 controlled by nitrogen dilution valve 216.

The 90% depletion dip tube 207 samples gas at a position approximately 90% through the scavenger bed and connects via depletion sensor valve 208 to the outlet flexible connection 212. When the depletion sensor valve 208 is in the open position, gas from the dip tube passes through flexible connection 212 to the outlet pathways as described above, and it may be sampled via hazardous gas detector port 219. Thus the hazardous gas detector (not shown) connected to the port 219 can be used not only to detect breakthrough, but also to predict breakthrough so that the scrubber may be changed out before breakthrough occurs.

If the scrubber is being changed out or is otherwise preferred to be off line, option by-pass gas flow pathway 218 may be used, by closing inlet valve 203 and outlet valve 210 and opening the normally closed by-pass valve 231.

The features and advantages of the invention are more fully illustrated by the following non-limited examples, wherein all parts and percentages are by weight, unless otherwise expressly stated.

EXAMPLE 1

A solution consisting of 92 lbs of copper sulfate pentahydrate in 33 liters of water was dissolved with heating in a rotary dryer. To this solution was added 58 lbs of $8 \times 12$ mesh silica gel. The excess water was removed by drying at 230°–240° F. under a vacuum of 29 inches of Hg over a period of 380 minutes. Residual water scavenger was 9.5%. The scavenger product was screened to remove fine particles less than 20 mesh.

A 100 ml sample of this scavenger material was treated with neat ammonia at a flow rate of 20 standard cubic centimeters per minute (sccm). An MDA toxic gas monitor with a detection limit of 2.5 ppm was used to monitor for ammonia downstream. 10.33 hours were required to achieve breakthrough, corresponding to a capacity of 5.5 moles ammonia/liter of bed.

EXAMPLE 2

A 20 ml sample of the ammonia saturated scavenger from Example 1 was treated with arsine at 20 sccm. A capacity of 0.5 moles of arsine per liter of resin was obtained, showing good hydride scavenging ability in the presence of ammonia.

EXAMPLE 3

37 gallons of the scavenger material produced as described in Example 1 was used to treat the effluent of a thermal silicon nitride process. The process gases consisted of dichlorosilane (65 sccm) and ammonia (200 sccm). The process was a low pressure process, utilizing a roots blower and an oil-free backing pump. The pump was purged with approximately 60 standard liters per minute (slm) of nitrogen. The effluent was monitored for silane with an MDA toxic gas monitor with an alarm point of 5 ppm. The system worked with no silane breakthrough for six months.

EXAMPLE 4

A solution containing 81 lbs of copper sulfate in 30 liters of water was prepared with heating in a rotary dryer. 75 lbs of $30 \times 60$ mesh silica gel was charged to the solution and excess water was removed with heating at 240°-250° F. under a vacuum of 28.7 inches of Hg. Residual water was 4.5 weight percent. The product was fluidized to remove fine particles before use.

A 1 liter sample of this material was treated sequentially with silane, ammonia and silane/ammonia mixtures, and the results are tabulated as Experiments 1-15 in Table I. Residence time of effluent gas in the scavenger bed is calculated as the ratio of bed volume in liters to flow rate in liters per minute. Comparison of experiment 1 and 2 shows that $CuSO_4.xH_2O$/silica gel cannot handle residence times of 0.5 minutes without silane bleed. As seen in experiments 4-6, a brief ammonia exposure improved silane scrubbing efficiency, but silane bleed was still detectable in the absence of ongoing ammonia flow. Experiments 8 and 9 clearly show that the presence of excess ammonia improves the efficiency of silane scrubbing. Experiments 13-15 show that silane scrubbing efficiency decreases in the presence of excess silane. No ammonia was detected at the outlet of the scrubber at any time during the course of this test (2.5 ppm detection limit).

TABLE I

| Expt No. | Exposure time (minutes) | Silane flow (sccm) | Ammonia flow (sccm) | Argon flow (sccm) | Silane outlet concentration (ppm) |
| --- | --- | --- | --- | --- | --- |
| 1 | 10 | 5 | — | 700 | 0* |
| 2 | 2 | 5 | — | 2000 | >15 |
| 3 | 10 | 5 | — | 700 | 0 |
| 4 | 20 | — | 35 | 700 | 0 |
| 5 | 13 | 5 | — | 700 | 0 |
| 6 | 5 | 5 | — | 2000 | 11-14 |
| 7 | 3 | 5 | — | 700 | 0 |
| 8 | 8 | 5 | 35 | 700 | 0 |
| 9 | 6 | 5 | 35 | 2000 | 0 |
| 10 | 19 | 5 | — | 2000 | 3.8 |
| 11 | 11 | 5 | 35 | 2000 | 0** |
| 12 | 19 | 5 | 70 | 2000 | 0 |
| 13 | 20 | 10 | 5 | 2000 | 4.2 |
| 14 | 2 | 28 | 5 | 2000 | >15 |
| 15 | 11 | 28 | 5 | 700 | 1.8 |

*Silane bleed was detected initially, but following 7 minutes of conditioning no more silane bleed was detected.
**Gradually improved from 3.2 ppm when the ammonia was restarted to none detected in 8 minutes.

EXAMPLE 5

58 lbs of molecular sieves were treated with a solution of 2.35 kilograms of copper sulfate pentahydrate in 9 liters of water. The sample was dried at 250° C. for several days with flowing nitrogen until no residual water was detected.

The sample was treated with silane, ammonia and silane ammonia mixtures. Argon was used as the dilution gas. Argon flow rates of up to 20 slpm were used with no evidence of breakthrough, as shown in Table II. This example clearly shows the high efficiency scrubbing which can be obtained by lightly loaded copper sulfate on molecular sieves. No ammonia was detected at any time during the experiment (2.5 ppm detection limit).

TABLE II

| Expt No. | Exposure Time (minutes) | Silane flow (sccm) | Ammonia flow (sccm) | Argon flow (sccm) | Silane outlet concentration (ppm) |
| --- | --- | --- | --- | --- | --- |
| 16 | 6.5 | 5 | — | 700 | 0 |
| 17 | 13 | 5 | — | 10,000 | 0 |
| 18 | 10 | 5 | — | 700 | 0 |
| 19 | 6 | — | 35 | 700 | 0 |
| 20 | 3 | — | 35 | 5000 | 0 |
| 21 | 3 | — | 35 | 10,000 | 0 |
| 22 | 15 | — | 35 | 700 | 0 |
| 23 | 25 | 5 | — | 700 | 0 |
| 24 | 11 | 5 | 35 | 10,000 | 0 |
| 25 | 5 | 5 | 35 | 700 | 0 |
| 26 | 8 | 5 | 70 | 700 | 0 |
| 27 | 5 | 5 | 70 | 10,000 | 0 |
| 28 | 10 | 10 | 5 | 700 | 0 |
| 29 | 10 | 10 | 5 | 10,000 | 0 |
| 30 | 6.5 | 28 | 5 | 10-20,000 | 0 |

EXAMPLE 6

A two layer scavenger bed was prepared consisting of 50 ml of $CuSO_4$/13X molecular sieves on the bottom and 50 ml of $CuSO_4.xH_2O$/silica gel on top. The bed was treated from the top with a 4% silane in helium mixture at 500 sccm. The outlet of the bed was monitored for silane with an MDA toxic gas monitor. A capacity of 1.2 moles per liter was obtained before breakthrough was detected.

EXAMPLE 7

A 100 ml bed of $CuSO_4.xH_2O$/silica gel scavenger prepared as described in Example 1 was treated with 4% silane (balance helium) at 500 sccm. Immediate silane bleed, greater than 15 ppm was observed.

EXAMPLE 8

A 100 ml bed of $CuSO_4$/13X molecular sieves prepared as described in example 5 was treated with 4% silane (balance helium) at 500 sccm. The outlet of the bed was monitored for silane with an MDA toxic gas monitor. A capacity of 0.54 moles per liter was observed.

Comparison of Example 6 with Examples 7 and 8 show the advantages of the layered bed for achieving high efficiency silane scrubbing with high capacity.

EXAMPLE 9

100 ml of $CuSO_4.xH_2O$/silica gel is treated with ammonia at 20 sccm until spent, as described in Example 1. The sample is subsequently treated with dichlorosilane at 20 sccm. The outlet of the bed is monitored for HCl with an MDA toxic gas monitor. A capacity of 2.5 moles of dichlorosilane is obtained.

EXAMPLE 10

100 ml of $CuSO_4.xH_2O$/silica gel prepared as described in Example 1 is treated with dichlorosilane at 20 sccm. The test is run until HCl is detected at the outlet by means of an MDA toxic gas monitor. A capacity of 1.3 moles of dichlorosilane per liter of bed is obtained.

Comparison of Example 9 with Example 10 shows the advantage of the ammine complex in increasing the chlorosilane capacity of the scrubber.

While the invention has been described with reference to specific aspects, features, and embodiments, it will be apparent that numerous variations, modifications, and other embodiments may be employed, and accordingly, all such variations, modificatios, and embodiments are to be regarded as being within the spirit and scope of the invention.

While the invention has been described with specific reference to the purification of gas mixtures comprising ammonia and silane or chlorosilane gas components, the invention may be susceptible of application to other gas mixtures comprising other nitrogenous and silicon-containing gas components.

What is claimed is:

1. A dry scrubbing method for cleaning a gas mixture containing ammonia and least one silicon-containing gaseous component selected from the group consisting of silane and chlorosilanes, wherein the ratio R of the concentration of ammonia to the concentration of said at least one silicon-containing gaseous component in said gas mixture, is governed by the relationship:

$$1 < R \leq 14,$$

to yield treated gas having a reduced content of ammonia and said silicon-containing gaseous component, which comprises contacting the exhaust gas for sufficient time and at sufficient conditions with a bed of scavenger comprising an ammine-forming metal salt immobilized on a porous solid support, wherein the metal salt is (i) selected from the group consisting of sulfates, nitrates, chlorides, bromides, and iodides of copper, cobalt, iron, nickel, chromium, rhodium, palladium and platinum, and (ii) present on the support at a concentration of from 0.25 moles of metal per liter of scavenger to 2 moles metal per liter of scavenger.

2. A method as in claim 1, wherein the porous solid support material is selected from the group consisting of aluminosilicates, zeolites, alumina, silica, silica gel, kieselguhr, activated carbon, macroreticulate polystyrene-divinylbenzene copolymer and polystyrene-polyvinylpyridine.

3. A method as in claim 2, wherein the porous solid support has surface area greater than 100 square meters per gram.

4. A method as in claim 2, wherein the porous solid support material is high porosity silica gel.

5. A method as in claim 2, wherein the porous solid support material is a zeolite.

6. A method as in claim 1, wherein the scavenger is deployed in supported form as a composite bed of scavenger material, comprising a first scavenger material in a first contact region of the composite bed, wherein the ammine-forming metal salt of both the first scavenger material and the second scavenger material is the same, but wherein the support of the first scavenger material is different from the support of the second scavenger material.

7. A method according to claim 6, wherein the ammine-forming metal salt is copper sulfate, the first scavenger material support is silica gel, and the second scavenger material support is zeolite.

8. A method according to claim 6, wherein the first scavenger material and the second scavenger material are arranged in discrete, contiguous layers in the composite bed.

9. A method according to claim 6, wherein the first scavenger material and the second scavenger material are interspersed with one another in the composite bed.

10. A method as in claim 1, wherein the ammine-forming metal salt is selected from the group consisting of copper sulfate and iron sulfate.

* * * * *